May 15, 1951 R. L. CARBREY 2,552,619

ELECTRON BEAM CODER FOR PULSE CODE MODULATION

Filed March 5, 1949

INVENTOR
R.L. CARBREY
BY
ATTORNEY

Patented May 15, 1951

2,552,619

UNITED STATES PATENT OFFICE 2,552,619

ELECTRON BEAM CODER FOR PULSE CODE MODULATION

Robert L. Carbrey, Summit, N. J., assignor to Bell Telephone Laboratories, Incorporated, New York, N. Y., a corporation of New York Application March 5, 1949, Serial No. 79,870

9 Claims. (Cl. 332—11)

This invention relates to coding circuits for pulse code modulations systems.

In communication by the method known as pulse code modulation a message wave to be transmitted is sampled periodically and the amplitude of each sample is represented for transmission by a code analogous to telegraph codes. Conveniently, such codes are based on the permutation of a fixed number of elements N each of which have any of $m$ values to provide $m^N$ unique code combinations. For the purpose of transmission by pulse code modulation, each of the N code elements may be represented by a pulse which may have any of $m$ different amplitudes.

One permutation code which has been used in pulse code modulation systems is based upon the binary system of numeration. Each of the N code elements then has either of two values and the total number of permutations is equal to $2^N$. The required two values are most conveniently represented for transmission by bi-valued pulses, usually "on" or "off" pulses, although pulses of two different finite amplitudes are occasionally employed.

Since the signal to be transmitted may be continuously variable and the total number of permutations available in any code is limited, only a quantized replica of the message signal can be transmitted. Thus the total ampltiude range available for the signal is divided into a finite number of constituent amplitude ranges each corresponding to one of the permutations available in the code employed. The message signal samples are then compared with the quantized amplitude range to determine which of the quantized amplitudes most nearly represents the sample and the code group representing that quantized amplitude is transmitted.

Various circuits have been devised for producing pulse code groups representing the amplitudes of applied message samples. Many of these employ electron beam tubes with masks arranged through interception of the electron beam in selective areas to produce the requisite code pulses. In one particular form of coder of this general type, disclosed in the copending application of M. E. Mohr (14) Serial Number 75,347, filed February 9, 1949, each of the possible quantized amplitudes representable by the code to be employed is assigned a separate target to which the electron beam of a cathode ray tube may be deflected. Electrical networks associated with the targets form circuits to be completed by the electron beam to the proper ones of a group of output terminals corresponding to the elements of the code employed thus producing the code group representing the signal amplitude to which the particular target corresponds.

It will be noted, however, that in this type of coder, a separate target must be provided for each of the quantized signal amplitudes. Hence, when it is desired to employ a large number of amplitude steps or quanta to provide accurate representation of small differences in amplitude, a problem arises as to the accommodation within the envelope of a practical electron beam tube of the requisite number of target electrodes.

It is therefore the object of the present invention to retain the advantages of the type of electron beam coder referred to above while providing for the use of a greatly increased number of amplitude steps all within the limitations of practical electron beam tube construction.

In accordance with the invention the number of target electrodes required for a given number of amplitude steps is reduced through the use of a quantizing system defining a plurality of deflection paths each intercepting each of a plurality of target electrodes. When the signal amplitude exceeds that which may be encoded by the number of target electrodes provided, the beam is shifted from one deflection path to an adjacent deflection path. A voltage is subtracted from the signal applied to the deflection system equal to the total range encodable in the path previously occupied by the beam and additional pulses are generated for transmission indicating which of the deflection paths is employed in producing the code group.

The above and other features of the invention will be considered in detail in the following specification taken with the drawings in which.

Figures 1, 2, 3:
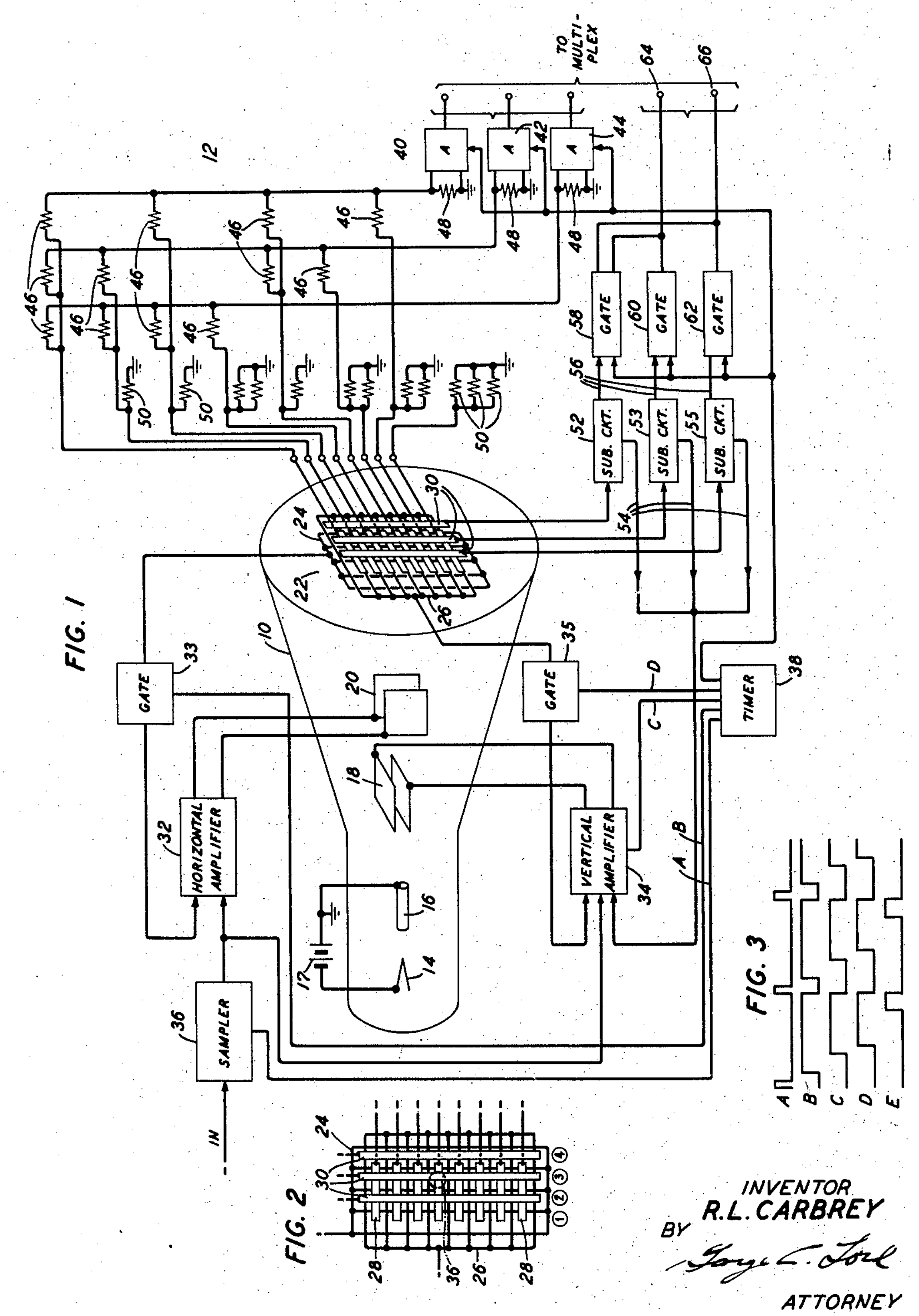
Fig. 1 is a circuit diagram partially in block form of a complete coding system in accordance with the invention.
Fig. 2 is a plan view of the array of coding elements of the cathode ray coding tube of Fig. 1.
Fig. 3 is a series of graphs illustrating the operation of the coder.

Referring now to Fig. 1, the coder includes an electron beam tube 10 together with a coding network 12 and auxiliary circuits arranged to control the application of message signals to the coding tube and the production of the required code group pulses. In the arrangement of the illustrated coder it has been assumed that it is desired to transmit thirty-two quantized amplitudes using binary code and that the extent of vertical deflection limits to eight the number of quantized positions to which the beam may be shifted by vertical deflection.

The electron beam tube 10 is provided with a conventional electron gun system arranged to produce an electron beam and shown schematically as comprising a cathode 14, an accelerating and focusing electrode system 16, and a source of potential indicated as a battery 17, connected in the usual manner. Paired, vertical and horizontal deflection plates 18 and 20, respectively, are provided to control the point at which the electron beam intercepts the target array 22.

The target configuration is shown in detail in Fig. 2. A grid system comprising orthogonal sets of grid wires 24 and 26, respectively is provided to define target locations to which the beam may be deflected. Grid wires 26 are spaced to define a plurality of target areas to which the electron beam may be deflected through the action of vertical deflection plates 18. In accordance withh the assumption, made above as to the nature of the desired code, the vertical quantizing grid network 26 is arranged to define eight different target areas. Since it is desired to transmit a total of thirty-two different message signal amplitudes, the vertical quantizing grid 24 is arranged according to the invention to define four vertical paths, numbered 1, 2, 3 and 4 in Fig. 2, in which the beam may be deflected by vertical deflection plates 18. (Expressed in generalized form, $m^{n+p}$ different amplitudes are encoded by use of a configuration of target electrodes and associated quantizing grids defining $m^n$ different vertical levels and $m^p$ different paths intersecting these levels for vertical deflection of the beam. A code of $n$ pulses then serves to indicate which of the $m^n$ vertical levels is occupied by the beam, while a code of $p$ pulses indicates in which of the intersecting paths the beam is deflected.)

Horizontal targets 28 are positioned in each of the eight target areas defined by grid 26 and each is arranged for interception by the beam upon deflection in any of the four vertical deflection paths. In addition vertical collector electrodes 30 are provided for interception by the electron beam during deflection in each of the vertical deflection paths 2, 3 and 4 defined by quantizing grid 24.

As shown in Fig. 1, horizontal and vertical amplifiers 32 and 34, respectively, are provided to control the application of potentials to the horizontal and vertical deflecting plates 18 and 20. The grids 24 and 26 are connected to amplifiers 32 and 34, respectively, to form quantizing systems of the same general type as that disclosed in copending application of G. Hecht, Serial No. 715,999, filed December 13, 1946, now Patent No. 2,463,535, March 8, 1949, which are arranged to hold the electron beam within a particular area defined by the intersecting quantizing grids to which it may be deflected. To this end the vertical quantizing grid 26 is connected through a gate circuit 25 to the input of vertical amplifier 34 while horizontal quantizing grid 24 is correspondingly connected through a gate circuit 33 to the input of horizontal amplifier 32. If, for example, the electron beam has been deflected to a desired one of the vertical columns, gate circuit 33 is enabled to complete the quantizing circuit. Under these conditions, a voltage will be fed back to the input of horizontal amplifier 32 whenever the beam drifts toward either of the wires of grid 24 which define that particular column. This voltage may be made of the proper polarity to oppose further horizontal deflection of the beam and to stabilize the beam at an equilibrium position between grid wires and somewhat closer to one wire than the other. The vertical quantizing circuit operates in an entirely analogous manner to hold the electron beam in the proper one of the eight target areas to which it is deflected by the application of a signal to the vertical amplifier 34. Thus as shown in Fig. 2 by the dotted circle 36 the electron beam may be accurately positioned within a particular area defined by the two sets of quantizing grids in such a way that it intercepts a single one of the target electrodes 28 and (except in vertical deflection path 1) one of collector electrodes 30. Thenceforth the beam cannot be moved from this position without breaking the feedback circuits. Control of gates 33 and 35 to complete the corresponding quantizing circuits after the desired deflections of the beam and to open these circuits to allow a subsequent deflection is effected by timer 38 as will be considered hereinafter.

It will be recalled that a three-unit binary code is to be generated representing the message amplitudes within the vertical deflection range and that additional code pulses are to be generated effectively to extend the amplitude range to a total of thirty-two different values. Generation of the three-unit code will be considered first.

A message signal to be transmitted is applied to a sampler unit 36 the function of which is successively to obtain and store samples of the message signal amplitude at a rate which is at least twice as great as the highest frequency component of the message signal which it is desired to transmit. This sampler may be of known form and may conveniently comprise a pair of electron tubes connected back to back to provide a two-directional conductive path between the input circuit and a storage capacitor. These electron tubes are turned on periodically by sampling pulses derived from timing circuit 38 and during each such sampling pulse current flows to or from the storage capacitor depending upon whether the amplitude of the message signal at that instant is greater or less than the amplitude of the charge previously stored in the storage capacitor. The message samples produced by sampler 36 are applied to the inputs of horizontal and vertical amplifiers 32 and 34.

In considering the operation of the coder for the production of three-unit code, let it be assumed that the voltages applied to horizontal deflection plates 20 are such that the electron beam is confined to move in vertical path 1. The target electrodes 28 (Fig. 2) are connected through an external resistance network to each of three gated output amplifiers 40, 42 and 44, representing the three code elements of the code, these amplifiers being enabled only at the completion of the coding interval. The arrangement of the desired code is as follows, 1 representing the presence of a signal voltage at the outputs of the corresponding amplifiers and 0 representing the absence of such a signal:

| Code | Decimal |
|---|---|
| 111 | 7 |
| 110 | 6 |
| 101 | 5 |
| 100 | 4 |
| 011 | 3 |
| 010 | 2 |
| 001 | 1 |
| 000 | 0 |

Accordingly, the resistors of the coding network 12 are arranged to interconnect the eight target electrodes 28 and the appropriate ones of the output amplifiers 40, 42 and 44 to produce code groups corresponding to the above table and representing the target to which the electron beam is deflected. Thus no connection is made through network 12 between the lowest of targets 28 (representing a signal amplitude of zero) and the output amplifiers 40, 42 and 44. The uppermost target, corresponding to a signal deflection of seven units, is connected to each of the three output amplifiers while the remaining target electrodes are connected to the output amplifiers in correspondence with their respective code groups. Each connection from a target electrode 28 to an output amplifier is through a resistor 46 and all of resistors 46 are of identical values. The input circuit of each of amplifiers 40 through 44 includes a resistor 48 the impedance of which is very low with respect to the impedances offered by resistors 46 of the coding network. Since the nature of the code is such that different numbers of coding resistors 46 are included in the output circuits of the various target electrodes, additional resistors 50 each of the same resistance as resistors 46 are provided to make equal the total number of resistors connected to any target thus to equalize the impedances seen by the coding electrodes. Inasmuch as the input resistors of the amplifiers offer much lower impedances than the resistors 46 or 50 their effect may be ignored.

Thus, as is pointed out in greater detail in the copending application of M. E. Mohr, referred to above, the impingement of the electron beam on any one of coding electrodes 28 produces an appropriate combination of output voltages from amplifiers 40 through 44 to represent the amplitude to which the particular target electrode corresponds according to the code employed.

It will be recognized, however, that the elements thus far described provide means for producing codes capable of representing only eight different amplitudes, i. e., amplitudes from zero to seven and that it is desired to transmit a total of thirty-two different amplitudes. To this end the additional deflection paths 2, 3 and 4 have been provided. It will be recalled that it was assumed that vertical deflection of the electron beam in response to the message signal sample would proceed in deflection path 1. Actually the deflection path to be occupied by the beam during its vertical deflection depends upon the message signal amplitude. For this purpose the vertical amplifier is normally cut off and is enabled by a pulse from timer 38 only after an interval which is sufficiently long to permit deflection of the beam to the proper vertical column by horizontal amplifier 32. The gain of the horizontal amplifier is such that the electron beam is deflected to the first deflection path for signals having amplitudes between zero and seven, to the second deflection path for signals having amplitudes between eight and fifteen, to the third deflection path for signals of amplitudes between sixteen and twenty-three and to the fourth deflection path for signals having amplitudes between twenty-four and thirty-one. This operation occurs before any deflecting voltages are applied to vertical deflecting plates 18.

Since the total range accommodated by the target array for vertical deflection is only eight units, the input to the vertical amplifier 34 is modified in accordance with the amplitude range represented by the deflection path to which the electron beam has previously been deflected. Thus, if the beam has been deflected to the second deflection path, a quantity corresponding to eight units of amplitude is subtracted from the input of the vertical amplifier before it is enabled by timing circuit 38. The net input thereto is then of some value between zero and seven units of amplitude and the electron beam is accordingly deflected to the appropriate one of target electrodes 28 to represent such amplitude. Similarly quantities corresponding to sixteen and twenty-four units of amplitude are subtracted from the input to the vertical amplifier when the beam occupies the respective deflection paths 3 and 4.

The equipment for producing the voltages to be subtracted from the input of vertical amplifier 34 includes the previously described collector electrodes 30 which are positioned for interception by the electron beam during deflection in each of deflection paths 2, 3 and 4. The collector electrodes 30 for paths 2, 3 and 4 are connected to subtracting circuits 52, 53 and 55, respectively. These subtracting circuits may conveniently comprise double stability circuits of the type commonly known as "flip-flop" circuits. Such circuits are disclosed in "Radio Engineering," third edition, by F. E. Terman, beginning at page 595. As there disclosed these circuits ordinarily include two vacuum tubes so interconnected that only one may draw current at a time with the result that in either condition of stability the anode potential of the conducting tube will be considerably lower than that of the tube which is not conducting. By suitable connections between the anodes of the two tubes and the output leads the subtracting circuits may be arranged in such fashion that in one condition of stability outputs of eight, sixteen and twenty-four units of amplitude respectively are produced on the output leads 54 and in addition output signals are produced on leads 56, while in the other condition of stability no output voltages appear on either of these sets of leads. Upon impingement of the electron beam on the corresponding one of the collectors 30 the associated subtracting circuit is triggered to the condition of stability in which output voltages appear on leads 54 and 56 associated therewith. Leads 54 are connected together and to the input of the vertical amplifier while the leads 56 from subtracting circuits 52, 53 and 55 are connected to the inputs of gate circuits 58, 60 and 62, respectively. A timing pulse obtained from timer 38 is applied to the other input of each of these gate circuits simultaneously with the enabling pulse for amplifiers 40, 42 and 44. The gate circuits may be of any known type but conveniently comprise electron tubes having two control grids to each of which a positive potential must be applied to produce an output pulse. Two output terminals 64 and 66 are provided and gate circuits 58 through 62 are connected to the appropriate ones of these terminals to produce a two-unit code indicative of which of the gate circuits have been operated. This code which then defines which one of the vertical deflection paths has been employed is applied to the transmitting multiplex along with the pulses of the three-unit code produced by coding network 12. To this end the output of gate circuit 62 which is enabled when the electron beam falls in the second deflection path is connected to the output terminal 66 while the output of gate 60 which is enabled when the beam falls in deflection path 3 is connected to produce a pulse on output terminal 64 and the output of gate 58 which is enabled upon deflection of the beam in path 4 is connected to each of output terminals 64 and 66. Gate 58 is provided with two separate outputs to prevent cross-connection of terminals 64 and 66. The following code is thus produced; again 1 representing a signal output and 0 the absence of such an output:

| Path | Code |
|---|---|
| 1 | 00 |
| 2 | 01 |
| 3 | 10 |
| 4 | 11 |

Although binary codes have been shown for both the vertical and horizontal deflections it will be understood that other coders may be employed to represent either or both of these quantities.

The operation of the coder may be reviewed with reference to the wave forms of Fig. 3. These are produced by timing of circuit 38 which may be of conventional type and may include asymmetrical multivibrators, flip-flop circuits and delay lines.

The short pulses of curve A recur at the desired code group repetition rate and are applied to actuate the sampler 36. The sample of the message wave so obtained is held for the duration of the coding operation. Horizontal amplifier 32, being continuously operative, deflects the electron beam to that one of columns 1, 2, 3 or 4 which includes the proper range of message signal amplitudes. Thereafter the wave shown in curve B enables gate 33 to complete the quantizing circuit for horizontal quantizing grid 24. This in effect "locks" the beam in the selected vertical column until the gate is opened to interrupt the feedback circuit at the end of the coding interval.

Shortly after the initiation of the holding action of the horizontal quantizing circuit, vertical amplifier 34 is enabled by the application of the wave of curve C. The input to the amplifier at this time is the difference between the amplitude of the message sample and the quantity produced by the action of subtraction circuit 52, 53 or 55 in response to the previous deflection of the beam to the corresponding one of the vertical columns. If the beam remains in column 1 after the horizontal deflection discussed above, the input to the vertical amplifier is, of course, equal to the amplitude of the message sample.

After an interval sufficient to allow completion of the vertical deflection, gate 35 is enabled by application of the wave of curve D to bring the vertical quantizing circuit into operation At this time the beam is "locked" in that one of the thirty-two possible target locations which uniquely represents the amplitude of the message sample. Timing wave E (Fig. 3) is then applied simultaneously to enable amplifiers 40, 42 and 44 and gates 58, 60 and 62 to produce output pulses as described above. These pulses may be transmitted simultaneously by frequency division multiplex or serially by time division multiplex.

What is claimed is:

1. In a communication system, a coder for producing permutation code groups of pulses representing the instantaneous amplitudes of the message wave, each group containing a total of $n+p$ pulses each of which may have any of $m$ values comprising, means for establishing a cathode-ray beam, first and second deflecting means operative to produce deflections in separate paths in response to the instantaneous amplitude of said message wave, first and second arrays of targets comprising $m^{p-1}$ and $m^n$ targets respectively arranged to intercept said cathode-ray beam and to define the amplitudes of deflections produced by said first and second deflecting means, respectively, means associated with each target array and actuated by impingement of the cathode-ray beam thereupon to produce in each case a code group of pulses uniquely representing the particular deflection which the beam has been given, and means for modifying the action of said second deflection means in accordance with the amplitude of the deflection of the beam produced by said first deflecting means.

2. In a communication system, a coder for producing code groups of pulses representing the instantaneous amplitude of the message wave, each group containing a total of $n+p$ pulses each of which may have any of $m$ values comprising, means for establishing a cathode-ray beam, first and second deflecting means operative to produce deflections in separate paths in response to the instantaneous amplitude of said message wave, means for quantizing the deflections produced by said first deflecting means into $m^p$ amplitude steps, first and second arrays of targets providing respectively $m^p$ and $m^n$ targets arranged for interception by said beam and to define respectively to which of the $m^p$ steps the beam is deflected by said first deflecting means and the amplitude of the deflection produced by said second deflecting means, means associated with each target array and actuated by impingement of the cathode-ray beam thereupon to produce in each case a code group of pulses uniquely representing the particular targets to which the beam is deflected and means for modifying the action of said second deflecting means in accordance with the amplitude of the beam deflection produced by said first deflecting means.

3. In a communication system, a coder for producing permutation code groups of pulses representing the instantaneous amplitude of the message wave, each group containing a total of $n+p$ pulses each of which may have any of $m$ values comprising, means for establishing a cathode-ray beam, first and second deflecting means operative to produce deflections in separate paths in response to the instantaneous amplitude of said message wave, means for quantizing the deflections produced by said deflecting means into $m^{p-1}$ and $m^n$ amplitude steps respectively, first and second arrays of targets arranged to intercept said cathode-ray beam and to define respectively to which of the $m^{p-1}$ and $m^n$ amplitude steps the beam is deflected by said first and second deflecting means, means associated with each target array and actuated by impingement of the cathode-ray beam thereupon to produce in each case a code group of pulses uniquely representing the particular deflection step to which the beam has been deflected, and means for modifying the action of said second deflection means in accordance with the amplitude step to which said cathode-ray beam is deflected by said first deflection means.

4. In a communication system, a coder for producing permutation code groups of pulses representing the instantaneous amplitude of the message wave, each group containing a total of $n+p$ pulses each of which may have any of $m$ values comprising, means for establishing a cathode-ray beam, first and second deflecting means operative to produce deflections in separate paths in response to the instantaneous amplitude of said message wave, means for quantizing the deflections produced by said deflecting means into $m^p$ and $m^n$ amplitude steps respectively, first and second arrays of targets arranged to intercept said cathode-ray beam and to define respectively to which of the $m^{p-1}$ and $m^n$ amplitude steps the beam is deflected by said first and second deflecting means, coding circuits associated with said first and second target arrays, said coding circuits including $p$ and $n$ output circuits respectively, and means interconnecting each target of the associated array and the $p$ and $n$ output circuits respectively, and providing in each instance a transmission characteristic corresponding to the one of the $m$ values for each pulse necessary to represent the amplitude step to which the target corresponds according to the code, and means for modifying the action of said second deflection means in accordance with the amplitude step to which said cathode-ray beam is deflected by said first deflection means.

5. In a communication system, a coder for producing permutation code groups of pulses representing the instantaneous amplitude of the message wave, each group containing a total of $n+p$ pulses each of which may have any of $m$ values comprising, means for establishing a cathode-ray beam, first and second deflecting means operative in response to applied signals to produce deflections in separate paths of the cathode-ray beam, means for quantizing the deflections produced by said deflecting means into $m^p$ and $m^n$ amplitude steps respectively, means for applying the message wave to said first deflecting means, means for applying the difference between the message wave and the amplitude represented by the deflection of the first deflecting means to said second deflecting means, first and second arrays of targets arranged to intercept said cathode-ray beam and to define respectively to which of the $m^p$ and $m^n$ amplitude steps the beam is deflected by said first and second deflecting means, and means associated with each target array and actuated by impingement of the cathode-ray beam thereupon for producing in each case a code group of pulses uniquely representing the particular deflection steps to which the beam is deflected.

6. In a communication system, a coder for producing permutation code groups of pulses representing the instantaneous amplitude of the message wave, each group containing a total of $n+p$ pulses each of which may have any of $m$ values comprising, means for establishing a cathode-ray beam, first and second deflecting means operative to produce deflections in separate paths in response to applied signals, means for quantizing deflections produced by said deflection means into $m^p$ and $m^n$ amplitude steps respectively, means for applying the message wave to said first deflecting means, means for applying the difference between said message wave and the amplitude represented by the deflection produced by said first deflecting means to said second deflecting means, means for first enabling said first applying means and thereafter enabling the means for applying the difference to said second deflecting means, and means responsive to the cathode-ray beam in response to said first and second deflecting means respectively to produce in each case a code group of pulses uniquely representing the particular deflection steps to which the beam has been deflected.

7. In a communication system, a coder for producing permutation code groups of pulses representing the instantaneous amplitude of the message wave, each group containing a total of $n+p$ pulses each of which may have any of $m$ values comprising, means for establishing a cathode-ray beam, first and second deflecting means operative to produce deflections in separate paths in response to applied signals, means for quantizing the deflections produced in said separate paths into $m^p$ and $m^n$ different amplitude steps respectively, an input amplifier for said first deflecting means arranged to apply said message wave thereto, an input amplifier for said second deflecting means having a gain equal to $m^n$ times the gain of the first-mentioned input amplifier, means for applying the difference between the instantaneous amplitude of said message wave and the amplitude represented by the step to which the beam is deflected by said first deflecting means, and means for each of said deflection paths and actuated by the cathode-ray beam to produce in each case a code group of pulses uniquely representing the particular deflection steps in said paths to which the beam has been deflected.

8. In a communication system, a coder for producing permutation code groups of pulses representing the instantaneous amplitude of the message wave, each group containing a total of $n+p$ pulses each of which may have any of $m$ values comprising, means for establishing a cathode-ray beam, horizontal and vertical deflection systems for said beam, an input amplifier controlling each of said deflection systems, orthogonal sets of grid wires one for each deflection system connnected to feed back a portion of the cathode-ray beam current to the respective amplifiers to provide respectively $m^p$ and $m^n$ permitted deflection steps for said beam, arrays of targets corresponding to said orthogonal sets of grid wires arranged upon impingement by the cathode-ray beam to define the deflection steps occupied thereby, means associated with each target array to produce in each case a code group of pulses representing the particular deflection step to which the beam has been deflected, and means for subtracting from the instantaneous amplitude of the message wave beam upon its application to said vertical deflection system a quantity proportional to the amplitude represented by the deflection step to which the beam is deflected by said horizontal deflection system in response to the instantaneous amplitude of said message wave.

9. In a coder for producing permutation code groups of pulses indicative of the instantaneous amplitude of a wave to be transmitted, means for sampling the amplitude of said wave at recurrent intervals, means for establishing a cathode-ray beam, a coding element having a plurality of defined areas each representing a different signal amplitude within a given range, means for defining a plurality of deflection paths for said beam each intercepting each of said defined areas, means responsive to signals falling within said range for deflecting the beam in one of said paths to the area corresponding to the signal amplitude, means for producing a permutation code group of pulses identifying the area to which the beam is deflected, means also responsive to said signal for shifting the beam from the path which it occupies to another path whenever the signal amplitude exceeds said range, means responsive to the beam in said other path to decrease the effect of the signal on said deflecting means by an amount equal to that produced by a signal of amplitude equal to the sum of the amplitude ranges accommodated in preceding paths, and means for producing pulses indicative of which path is occupied by the beam for the production of a code group.

ROBERT L. CARBREY.

No references cited.